United States Patent [19]
Blumenau

[11] Patent Number: 5,996,024
[45] Date of Patent: Nov. 30, 1999

[54] METHOD AND APPARATUS FOR A SCSI APPLICATIONS SERVER WHICH EXTRACTS SCSI COMMANDS AND DATA FROM MESSAGE AND ENCAPSULATES SCSI RESPONSES TO PROVIDE TRANSPARENT OPERATION

[75] Inventor: Steven Blumenau, Holliston, Mass.

[73] Assignee: EMC Corporation, Hopkinton, Mass.

[21] Appl. No.: 09/006,576

[22] Filed: Jan. 14, 1998

[51] Int. Cl.⁶ ............................. G06F 13/12; G06F 13/10; G06F 13/00; G06F 9/00

[52] U.S. Cl. ......................... 709/301; 709/213; 709/217; 709/212; 709/201; 707/10; 707/101; 710/100; 710/105; 710/9; 710/8; 711/112

[58] Field of Search .................................. 709/301, 201, 709/212, 217, 213; 707/10, 101; 710/100, 105, 101, 9, 8; 711/111, 112

[56] References Cited

U.S. PATENT DOCUMENTS

| | | |
|---|---|---|
| 5,206,946 | 4/1993 | Brunk . |
| 5,388,243 | 2/1995 | Glider et al. . |
| 5,463,772 | 10/1995 | Thompson et al. .................. 707/101 |
| 5,471,634 | 11/1995 | Giorgio et al. . |
| 5,491,812 | 2/1996 | Pisello et al. . |
| 5,504,757 | 4/1996 | Cook et al. . |
| 5,524,175 | 6/1996 | Sato et al. . |
| 5,548,731 | 8/1996 | Chang et al. .......................... 711/163 |
| 5,561,812 | 10/1996 | Ravaux et al. . |
| 5,574,861 | 11/1996 | Lorvig et al. . |
| 5,574,862 | 11/1996 | Marianetti, II . |
| 5,577,172 | 11/1996 | Vatland et al. . |
| 5,577,207 | 11/1996 | Pauget et al. . |
| 5,613,160 | 3/1997 | Kraslavsky et al. . |
| 5,640,541 | 6/1997 | Bartram et al. ..................... 395/500.47 |
| 5,664,221 | 9/1997 | Amberg et al. .......................... 710/9 |
| 5,787,019 | 7/1998 | Knight et al. ........................... 709/301 |
| 5,819,054 | 10/1998 | Ninomiya et al. ...................... 710/128 |
| 5,892,955 | 4/1999 | Ofer ........................................ 710/200 |

*Primary Examiner*—Ahmad F. Matar
*Assistant Examiner*—William D. Thomson
*Attorney, Agent, or Firm*—Maureen Stretch

[57] ABSTRACT

A network SCSI apparatus and method that comprises a network SCSI device driver which presents a SCSI device interface to a host computer for transmitting SCSI commands in packets over a network to one or more network SCSI applications servers on other computers at separate physical locations connected to local SCSI devices. In a preferred embodiment, the network SCSI device driver enables programs executing on the host computer to treat the local SCSI devices at the remote locations as though they were at the same location as the host computer, thereby overcoming limitations on the number of target devices available at the host site, as well as physical distance limitations imposed by SCSI device standards.

14 Claims, 6 Drawing Sheets

METHOD AND APPARATUS FOR A SCSI APPLICATIONS SERVER WHICH EXTRACTS SCSI COMMANDS AND DATA FROM MESSAGE AND ENCAPSULATES SCSI RESPONSES TO PROVIDE TRANSPARENT OPERATION

BACKGROUND OF THE INVENTION

1. Field of the Invention

This invention relates generally to the field of connecting to storage media such as disks and tapes and more particularly to the field of connecting to more SCSI storage devices than are physically available on a particular configuration or within a certain distance at a particular location.

2. Background

Many computer systems such as those using the UNIX™, MS/DOS™, Windows™, NT™, or Macintosh™ operating systems connect to mass storage devices over a parallel bus or connection known as a SCSI bus. Originally standing for Small Computer Systems Interface, SCSI is now synonymous with several ANSI standards for such connections—including SCSI-1, or SCSI-2, to Fast SCSI-2, Wide SCSI-2 or Fast-wide SCSI-2, and SCSI-3, among others. The SCSI standards describe not only the physical characteristics of the connection but also the protocol for sending and receiving data. One of the drawbacks of the SCSI standards is that they typically limit the number of SCSI "targets" (SCSI addresses on the bus-each target, in turn can include several devices which are addressed by logical unit numbers, "LUNs") which can be connected to a SCSI adapter or controller. For most computers there are also only a limited number of SCSI adapter or controller cards that can be connected to a host computer. Usually a SCSI adapter or controller can connect to only 8 or 16 targets and those targets must be physically located within 25 meters or a similarly small physical distance. This also tends to make it difficult to share SCSI devices between two or more computers.

It should be noted that SCSI-3 does allow a large number of LUN devices to be attached to each target, but it still limits the number of targets to 16 per adapter or controller, and still has physical distance limitations.

One attempt to overcome the distance limitations includes the use of repeaters or intermediate transmission devices, such as those described in U.S. Pat. No. 5,577,207 to Pauget et al., issued Nov. 19, 1996, entitled "System and Method for Connecting SCSI Units Spaced at Distance which is Greater than the Maximum Length Value of the SCSI Protocol." This is a hardware solution which requires the purchase of additional equipment. It attempts to overcome the distance limitations but not to address the limitations on the number of devices which can be attached.

SCSI devices have also been connected over local area network (LAN) networks, which include connections to printers and local servers. While not directly addressing any of the limitation problems, the Ethernet connection approaches usually involve some sort of hardware device such as a converter board which is included in the LAN and converts data from SCSI protocol format to Ethernet format, and vice versa. One such device designed to eliminate the need for a LAN server is described in U.S. Pat. No. 5,491,812, to Pisello et al., issued Feb. 13, 1996, entitled "System and Method for Ethernet to SCSI conversion." Such a device does not solve the problems on limitations on the number of targets. It also requires the purchase of additional hardware.

Fiber channel hardware technology overcomes many of these problems, by allowing a user to send SCSI protocol over a serial fiber optic bus that does not have the same limitations on number of connections, distances and sharing that standard SCSI buses do. However, fiber channel technology also requires the installation of new hardware connections between the SCSI devices and the computer, usually including new controllers or adapters.

These and other hardware solutions have been developed to overcome some or all of the SCSI limitations, but additional hardware is a key element in these solutions.

It is an object of this invention to provide a method for overcoming limitations on the number of SCSI devices which can be attached to a host computer.

It is another object of the present invention to provide a method for overcoming distance limitations on communications between a SCSI device and a host computer.

SUMMARY OF THE INVENTION

These and other objects are achieved by a network SCSI apparatus and method that comprises a network SCSI device driver which presents a SCSI device interface to a host computer for transmitting SCSI commands in packets over a network to one or more network SCSI server applications on other computers or specialized controllers such as Ethernet to fiber channel bridges at separate physical locations connected to local SCSI devices. In a preferred embodiment, the network SCSI device driver enables programs executing on the host computer to treat the SCSI devices at the remote locations as though they were at the same location as the host computer.

It is an aspect of the present invention that it uses existing high speed Ethernet connections when these are already in use at the host computer site, thus eliminating the need to purchase additional hardware.

It is another aspect of the present invention that it makes use of existing compression technology available for high speed Ethernet connections, so that performance is not degraded.

Still another aspect of the present invention is that it enables the storage centralization of a large number of hosts that could not otherwise be done because of the limitations on the number of connections of SCSI- based storage subsystems and on distance.

DETAILED DESCRIPTION OF THE INVENTION

Figure 1:
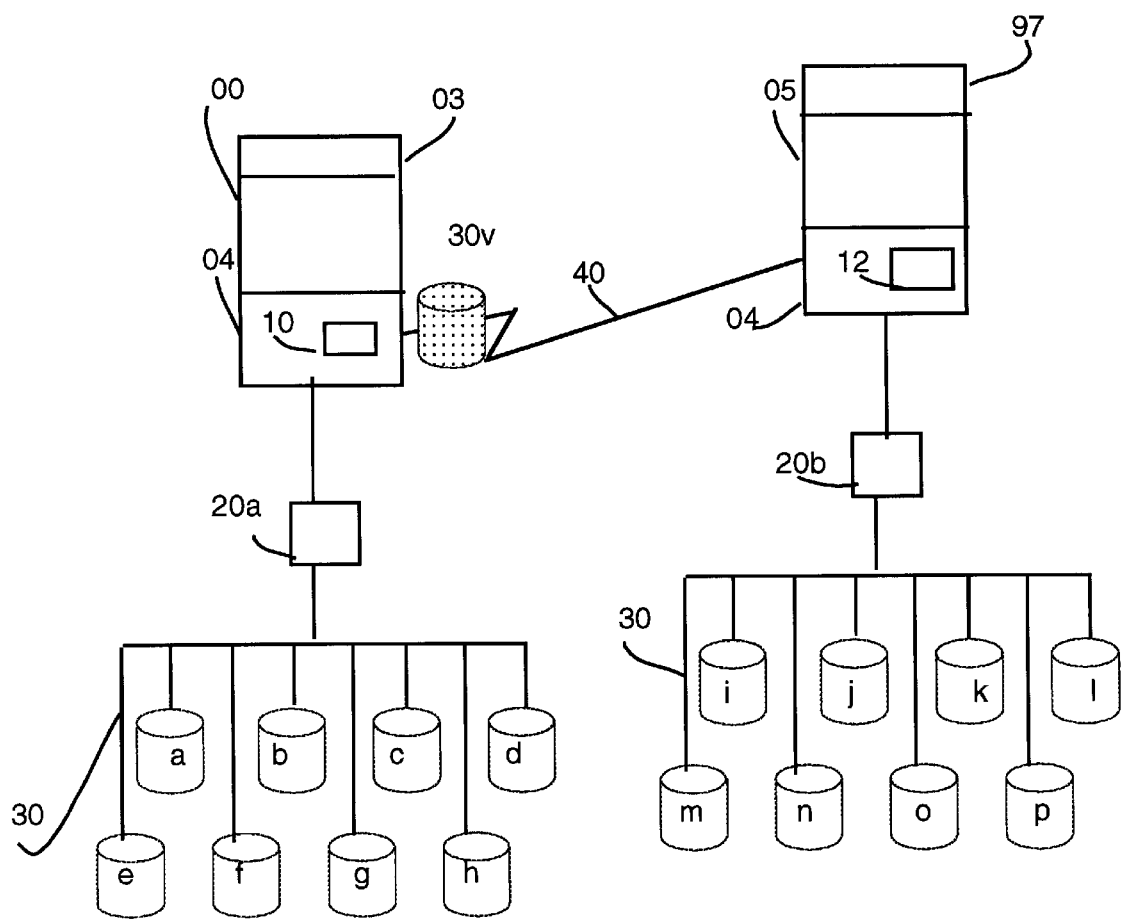
FIG. 1 is a block diagram of the present invention.

In FIG. 1, a block diagram of the present invention is shown. Host computer 00 has a SCSI adapter 20a connected to it, which, in turn, has several SCSI disks 30 connected to it. In a preferred embodiment of the present invention SCSI adapter 20*a* and disks 30 are part of applicant's assignee's EMC Corporation's Symmetrix systems, which allow each SCSI disk 30 to be identified by a target and logical unit number (LUN). Also in a preferred embodiment, network SCSI device driver 10 is included as part of operating system 04 which controls host computer 00. Those skilled in the art will appreciate that operating system 04 can be any operating system that supports the use of SCSI protocols and devices. Similarly, while a preferred embodiment creates network SCSI device drivers 10 for SCSI disk devices, those skilled in the art will appreciate that the apparatus and method described herein will also work for other SCSI devices, such as tape devices or scanners, optical disks, etc.

Still in FIG. 1, in a preferred embodiment, network SCSI device driver 10 is installed in operating system 04 and identified with at least one virtual target SCSI device. Each disk that is on a remote system can be assigned to a LUN. In the example shown in FIG. 1, if the programs executing in host computer 00 wish to access SCSI disk 30*j* on second computer 05, then network SCSI device driver 10 will be installed with the ability to address LUN 30*j*, even though that device is not physically attached to host computer 00.

When actual SCSI commands such as seek, read, and write to disk are sent to network SCSI device driver 10, it takes those commands, encapsulates them into messages and transmits them over network connection 40, addressed ultimately to SCSI device 30*j*. In a preferred embodiment, network connection 40 is a high speed Ethernet connection such as Megabit or Gigabit Ethernet. Thus, the effect of network SCSI device driver 10 is to make network connection 40 appear, temporarily, to the file system (or other application) of operating system 04 as though it were a disk device, such as virtual disk 30*v* of FIG. 1.

In a preferred embodiment, this use of a high speed Ethernet connection allows the user of host computer 00 to expand SCSI device availability and range without adding any new hardware, when the high speed Ethernet connection is already in place. Since many computer installations already have such connections, this is often the case.

Additionally, the use of existing high-speed Ethernet (or similar) network connections also allows the user to take advantage of existing Internet protocols in place for such networks, as well as existing compression technologies that are known in the art and used with such protocols. A high speed network connection helps in maintaining a fast response, so that latencies or waiting times for SCSI commands issued from host computer 00 over network connection 40 to SCSI devices actually located on the second computer are kept reasonably close to those the user would experience if the SCSI device were actually attached to the host computer 00.

Still in FIG. 1, the messages created by network SCSI device driver 10 are sent over network connection 40 to network SCSI server application 12 on computer 05. In a preferred embodiment, computer 05 can be any distance away from host computer 00. Thus, the present invention overcomes the physical distance limitation imposed by physical SCSI connections. Similarly, network SCSI device driver 10 handles any number of targets for devices not physically present on host computer 00, thereby overcoming the limitations on the number of targets. This is done by simulating many SCSI busses each with its own set of targets.

This ability to allow host computer 00 to send and receive data to and from SCSI devices on computer 05 means that existing sharing mechanisms can also be used between the two or more computers if such features are available in operating system 04.

Figure 2:
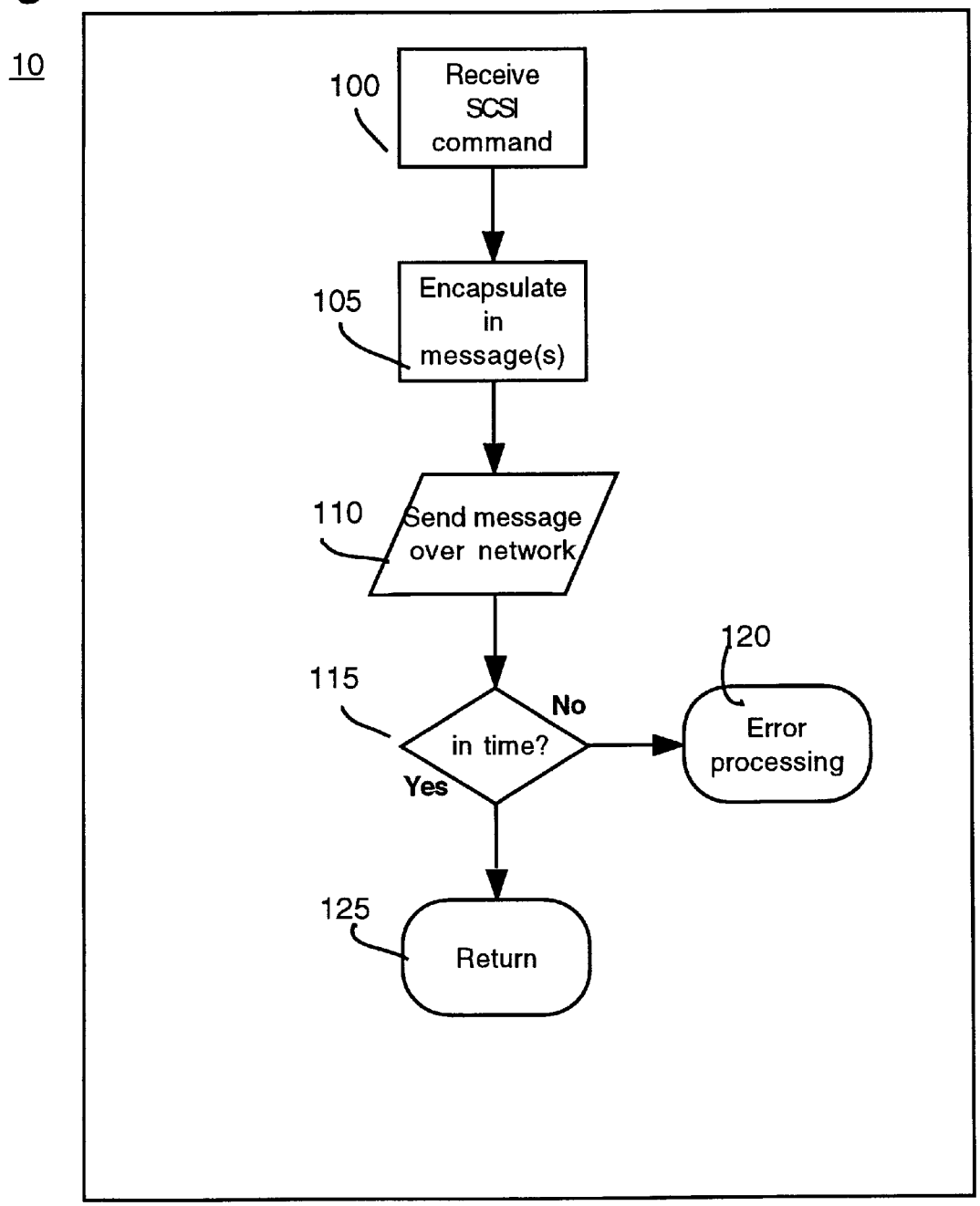
FIG. 2 is a flow diagram of a network SCSI device driver of the present invention.

With reference now to FIG. 2, a flow diagram of network SCSI device driver 10 of the present invention is shown. As seen there, at step 100, network SCSI device driver 10 receives a SCSI command from operating system 04. Those skilled in the art will appreciate that operating systems take input/output commands from applications programs (such as application program 03 in host computer 00 of FIG. 1) and essentially turn them over to the appropriate device driver for detailed handling. Thus, returning briefly to FIG. 1, if application program 03 had issued a seek command to a disk file name, the file system of operating system 04 would connect that disk name to a disk unit and a logical unit address, such as 30*j*. In a preferred embodiment of the present invention, network SCSI device driver 10 would be configured so that it is associated by operating system 04 with the target and LUN for disk 30*j*. When operating system 04 receives a read command from application program 03 for device 30*j*, it will send that command to network SCSI device driver 10.

Returning now to FIG. 2, once network SCSI device driver 10 has received the SCSI command, it encapsulates the command into one or more messages (depending on the size of any related data blocks) at step 105, and then, at step 110, sends the message out over network connection 40. Next, at step 115, network SCSI device driver 10 waits, if appropriate, for a response from network SCSI applications server 12. For certain types of devices, such as disks, there may be timeouts. That is, if a response from the disk is not received within a predefined time periods, that may be a sign of disk error. Depending on the type of SCSI device which network SCSI device driver 10 is representing to operating system 04, it will also check for such timeouts. If a timeout has occurred, network SCSI device driver 10 will proceed to step 120 to perform the appropriate error processing for such a timeout. If the transmission was successful, network SCSI device driver 10 returns at step 125.

Figure 3:
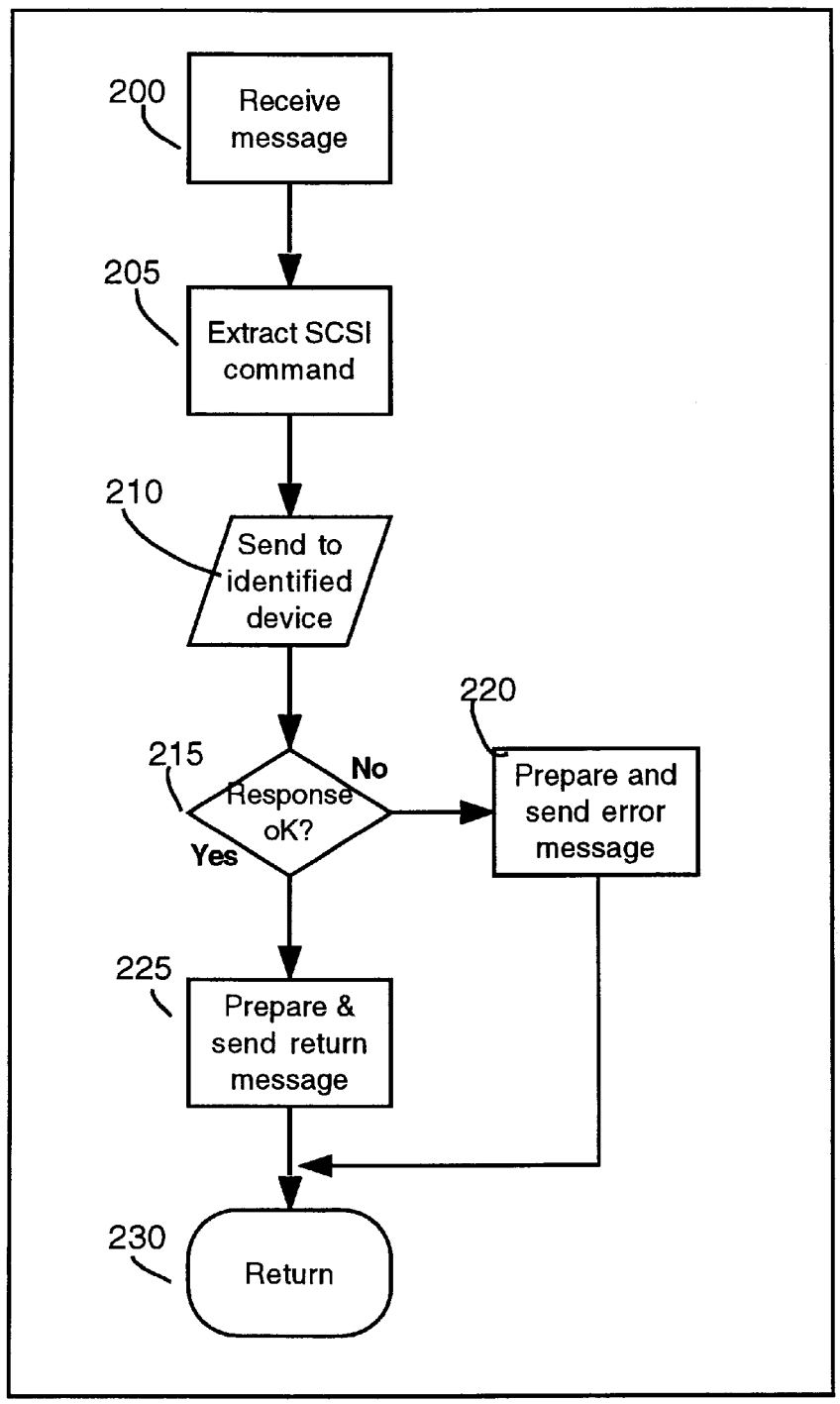
FIG. 3 is a flow diagram of a network SCSI server application of the present invention.

Now turning to FIG. 3, the processing of network SCSI application server 12 is shown in flow diagram form. As seen here, network SCSI application server 12 receives a message from network SCSI device driver 10 at step 200. Upon receipt, it proceeds to step 205 to extract the SCSI command from the message. Next, at step 210, network SCSI application server 12 sends the command to the identified device (in our example, disk 30*j* on computer 05). At step 215, network SCSI application server 12 waits for a response from the device and checks to see if it is good. If it is, network SCSI application server 12 proceeds to step 225 to prepare and send the response, including any data associated with it, in a message to be sent back to network SCSI device driver 10. Error processing is handled at step 220, and when processing of the incoming message has completed, network SCSI application server 12 returns at step 230.

Figure 4:
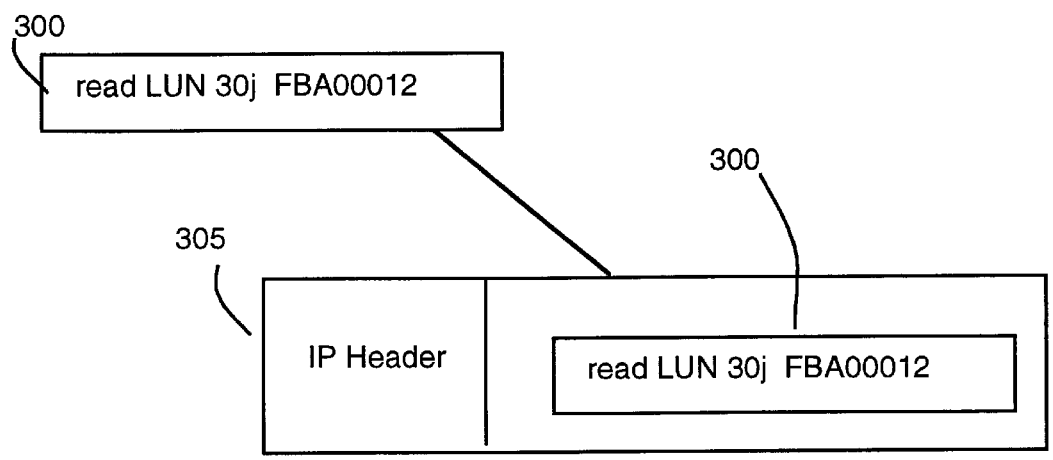
FIG. 4 is a block diagram of an illustrative SCSI command and message.

With reference now to FIG. 4, a conceptual block diagram of a SCSI read command 300 is shown, including a block diagram of a message 305 which contains a copy of SCSI read command 300 in it. In a preferred embodiment, the present invention uses existing TCP/IP packet switching protocols over high speed Ethernet connection 40.

Figure 5:
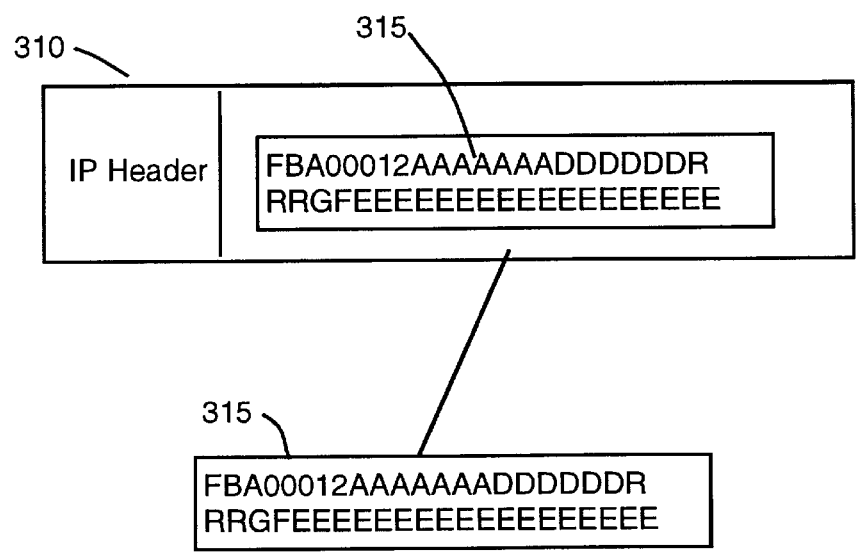
FIG. 5 is a block diagram of another illustrative SCSI command and message.

Now in FIG. 5, an illustrative example of the kind of contents of message 310 that might be returned by network application server 12 is shown. Here data block 315, which was read from SCSI device 30*j* on computer 05 is included in message 310 and sent back to network SCSI device driver 10 on host computer 00.

Figure 7:
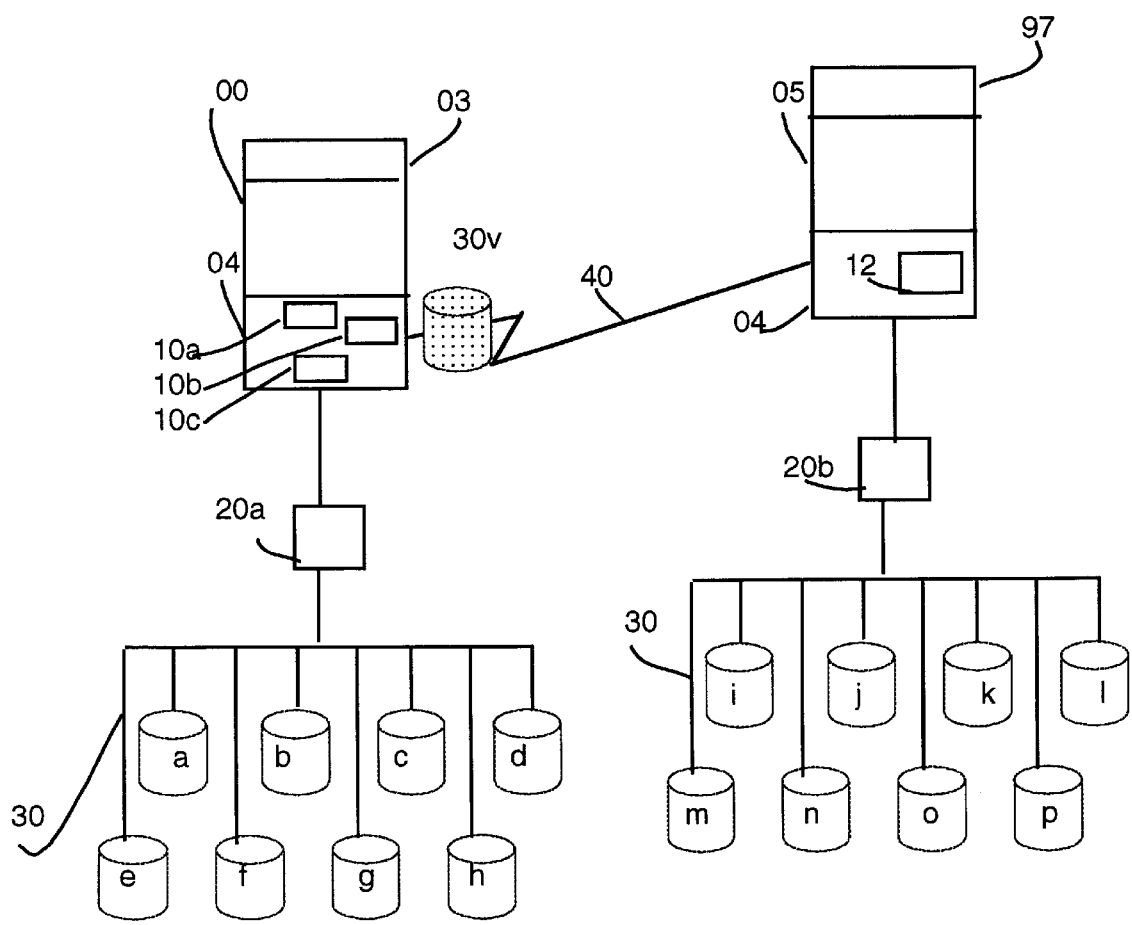
FIG. 7 is a block diagram of an alternative preferred embodiment of the present invention.

In an alternative preferred embodiment, network SCSI device driver 10 could be implemented as two or even three agents, each capable of handling a thread related to a SCSI command. This embodiment is shown in FIG. 7. As seen there, thread 10*a* of network SCSI device driver 10 could be implemented to handle encapsulating SCSI commands and data and sending them out in messages. Thread 10*b* could be implemented as a separate agent or program for watching for timeouts. Thread 10*c* could be implemented as a separate agent to receive responses and extract the data from them. In this alternative preferred embodiment, multiple threads can thus be active simultaneously. Thread 10*a*, for example, might be encapsulating a new SCSI seek command to send out, while thread 10*b* might be waiting for timeouts on an earlier SCSI read command already sent, and thread 10*c* might be processing the response from a SCSI write command sent out even earlier. In this alternative preferred embodiment, network SCSI applications server 12 could also be implemented as a multi-threaded application, if desired.

Figure 6:
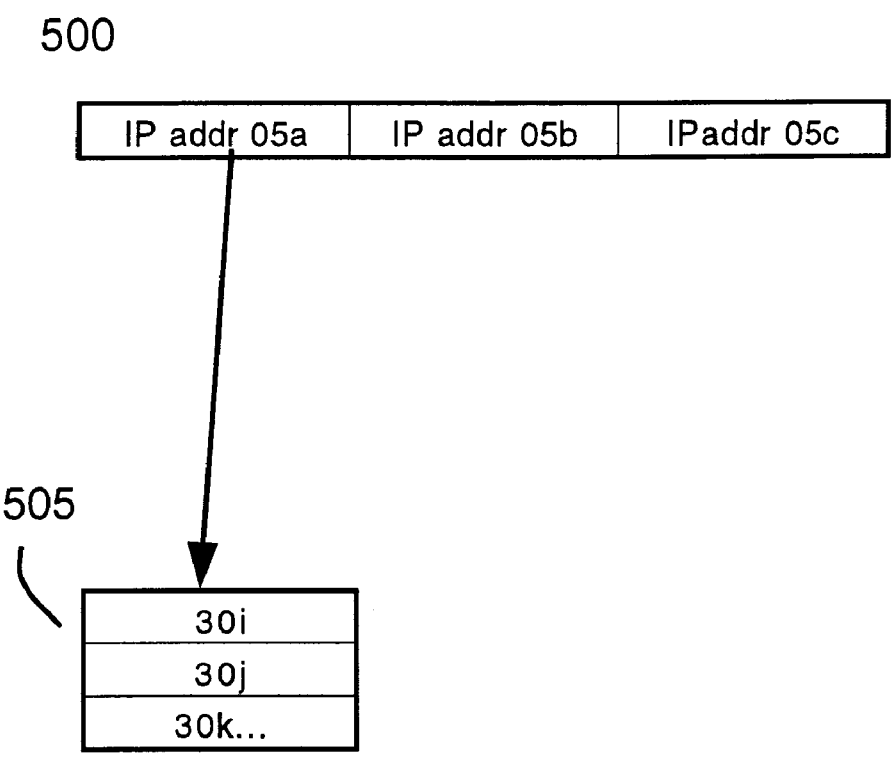
FIG. 6 is a block diagram of address tables according to the method and apparatus of the present invention.

Those skilled in the art will appreciate that network SCSI device driver 10 and network SCSI application server 12 need to keep track of the internet protocol (IP) (or other network protocol) addresses of the various computers and the SCSI devices they support. The tables in FIG. 6 illustrate how this is done. In a preferred embodiment, network SCSI device driver 10 will have available to it a table of IP addresses of other computers 05 which have SCSI devices of the type it is designed to reach. Similarly, in a preferred embodiment, network SCSI device driver 10 is able to verify the target and logical unit addresses, LUN's from tables such as table 5 which can be installed with network SCSI device driver 10 or dynamically loaded by network SCSI device driver 10.

In a preferred embodiment, network SCSI device driver 10 and network SCSI application server 12 are implemented in the C programming language and on the UNIX operating system. As will be apparent to those skilled in the art, however, they could also be implemented in assembler language or in ADA, Pascal, FORTRAN, or other computer programming language as well as other operating systems. In addition, while a preferred embodiment uses high speed Ethernet network connections, other high speed networks capable of speeds similar to or greater than Megabit or Gigabit Ethernet could be used, as long as they provide speed that is reasonably sufficient to prevent apparent timeouts for the particular SCSI devices and commands involved. Similarly, while a preferred embodiment uses a software implementation, part or all of the invention could also be implemented as firmware, microcode or even fixed circuitry, if desired.

Those skilled in the art will appreciate that the embodiments described above are illustrative only, and that other systems in the spirit of the teachings herein fall within the scope of the invention.

What is claimed is:

1. An apparatus for extending SCSI device capabilities on a host computer comprising:

a network SCSI device driver for presenting a SCSI device interface to said host computer and for sending and receiving messages containing SCSI commands and data sent to and from said SCSI device interface;

a high speed network connection between the host computer and a second computer having at least one local SCSI device, for transmitting messages from said host computer to said second computer;

a network SCSI applications server executing in the second computer for receiving and sending messages from said host computer and extracting SCSI commands and data from said messages to transmit said SCSI commands and data to said second computer's local SCSI device and encapsulate the responses from said local SCSI device into messages to be sent to said host computer, whereby said network SCSI device driver treats said messages containing responses from said second computer's local SCSI device as though they had been sent from a SCSI device attached to said host computer.

2. The apparatus of claim 1, wherein the high speed network connection further comprises a high speed Ethernet connection.

3. The apparatus of claim 2, wherein the high speed Ethernet connection further comprises network address tables available to the host computer for identifying the address of the second computer.

4. The apparatus of claim 1, wherein the SCSI device further comprises a disk drive.

5. The apparatus of claim 1, wherein the SCSI device further comprises a magnetic tape device.

6. The apparatus of claim 1, wherein the SCSI device further comprises a scanner for scanning images.

7. A method for extending SCSI device capabilities on a host computer comprising the steps of:

presenting, through a network SCSI device driver, a SCSI device interface to said host computer and sending and receiving messages containing SCSI commands and data sent to and from said SCSI device interface;

transmitting messages from said host computer to a second computer having at least one local SCSI device over a high speed network connection between said host computer and said second computer;

executing a network SCSI applications server in said second computer for receiving and sending messages from said host computer and for extracting SCSI commands and data from said messages to transmit said SCSI commands and data to said second computer's local SCSI device and encapsulate the responses from said local SCSI device into messages to be sent to said host computer, whereby said network SCSI device driver treats said messages containing responses from said second computer's local SCSI device as though they had been sent from a SCSI device attached to said host computer.

8. The method of claim 7, wherein the step of transmitting messages further comprises the step of transmitting messages over a high speed Ethernet connection.

9. The method of claim 8, wherein the step of transmitting messages over a high speed Ethernet connection further comprises the step of making a network address tables available to the host computer for identifying the address of the second computer.

10. The method of claim 7, wherein the step of presenting a SCSI device interface further comprises the step of presenting a SCSI device interface for a disk drive.

11. The method of claim 7, wherein the step of presenting a SCSI device interface further comprises the step of presenting a SCSI device interface for a magnetic tape device.

12. The method of claim 7, wherein the step of presenting a SCSI device interface further comprises the step of presenting a SCSI device interface for a scanner for scanning images.

13. An apparatus for extending SCSI device capabilities on a host computer comprising:
- a multi-threaded network SCSI device driver for presenting a SCSI device interface to said host computer and for sending and receiving messages containing SCSI commands and data sent to and from said SCSI device interface;
- a high speed network connection between the host computer and a second computer having at least one local SCSI device, for transmitting messages from said host computer to said second computer;
- a multi-threaded network SCSI applications server executing in the second computer for receiving and sending messages from said host computer and extracting SCSI commands and data from said messages to transmit said SCSI commands and data to said second computer's local SCSI device and encapsulate the responses from said local SCSI device into messages to be sent to said host computer, whereby said network SCSI device driver treats said messages containing responses from said second computer's local SCSI device as though they had been sent from a SCSI device attached to said host computer.

14. A method for extending SCSI device capabilities on a host computer comprising the steps of:
- presenting, through a multi-threaded network SCSI device driver, a SCSI device interface to said host computer and sending and receiving messages containing SCSI commands and data sent to and from said SCSI device interface;
- transmitting messages from said host computer to a second computer having at least one local SCSI device over a high speed network connection between said host computer and said second computer;
- executing a multi-threaded network SCSI applications server in said second computer for receiving and sending messages from said host computer and for extracting SCSI commands and data from said messages to transmit said SCSI commands and data to said second computer's local SCSI device and encapsulate the responses from said local SCSI device into messages to be sent to said host computer, whereby said network SCSI device driver treats said messages containing responses from said second computer's local SCSI device as though they had been sent from a SCSI device attached to said host computer.

* * * * *